US010880736B2

United States Patent
Park et al.

(10) Patent No.: US 10,880,736 B2
(45) Date of Patent: Dec. 29, 2020

(54) METHOD AND APPARATUS FOR TRANSMITTING AND RECEIVING ENCRYPTED MESSAGE BETWEEN TERMINALS

(71) Applicant: Samsung Electronics Co., Ltd., Gyeonggi-do (KR)

(72) Inventors: Jong-Han Park, Seoul (KR); Bo-Gyeong Kang, Seoul (KR); Jung-Je Son, Gyeonggi-do (KR); Duckey Lee, Seoul (KR); Ji-Cheol Lee, Gyeonggi-do (KR); Jung-Hwan Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 15/106,805

(22) PCT Filed: Dec. 19, 2014

(86) PCT No.: PCT/KR2014/012591
§ 371 (c)(1),
(2) Date: Jun. 20, 2016

(87) PCT Pub. No.: WO2015/093898
PCT Pub. Date: Jun. 25, 2015

(65) Prior Publication Data
US 2016/0360402 A1 Dec. 8, 2016

(30) Foreign Application Priority Data

Dec. 20, 2013 (KR) .................. 10-2013-0160628
Jul. 30, 2014 (KR) .................. 10-2014-0097193

(51) Int. Cl.
*H04W 12/02* (2009.01)
*H04L 9/00* (2006.01)
(Continued)

(52) U.S. Cl.
CPC .......... *H04W 12/02* (2013.01); *G06F 21/606* (2013.01); *H04L 9/006* (2013.01); *H04L 9/0822* (2013.01);
(Continued)

(58) Field of Classification Search
CPC ....... H04W 12/02; H04W 12/04; H04W 4/12; H04W 12/0013; G06F 21/606;
(Continued)

(56) References Cited

U.S. PATENT DOCUMENTS 7,373,330 B1 * 5/2008 Klebe .................... G06Q 10/10
380/200
8,954,726 B1 * 2/2015 Statica .................... G06F 21/84
713/151

(Continued)

FOREIGN PATENT DOCUMENTS

CN 1719368 A 1/2006
CN 101064595 A 10/2007
(Continued)

OTHER PUBLICATIONS

Tung et al., Pandora Messaging: An Enhanced Self-Message-Destructing Secure Instant Messaging Architecture for Mobile Devices, Mar. 2012, 26th International Conference on Advanced Information Networking and Applications Workshops, pp. 720-725 (Year: 2012).*

(Continued)

*Primary Examiner* — Kenneth W Chang

(57) ABSTRACT

The present invention relates to a method for transmitting an encrypted message at a transmission device, the method comprising: if a first user input to run a message application is detected, displaying a keyboard supporting a security mode; detecting a second user input to select the security mode; switching to the security mode in response to the (Continued)

second user input, and then receiving a message input by a user and temporarily storing the message; if a writing completion instruction of the message is detected on the keyboard, encrypting the message; and transmitting, to a reception device, the encrypted message.

20 Claims, 13 Drawing Sheets

(51) Int. Cl.
*H04L 9/08* (2006.01)
*H04L 29/06* (2006.01)
*G06F 21/60* (2013.01)
*H04W 12/00* (2009.01)
*H04W 12/04* (2009.01)
*H04W 4/12* (2009.01)

(52) U.S. Cl.
CPC ........ *H04L 9/0825* (2013.01); *H04L 63/0428* (2013.01); *H04W 12/0013* (2019.01); *H04W 12/04* (2013.01); *H04W 4/12* (2013.01)

(58) Field of Classification Search
CPC ..... H04L 9/006; H04L 9/0822; H04L 9/0825; H04L 63/0428
See application file for complete search history.

(56) References Cited

U.S. PATENT DOCUMENTS

| | | | | |
|---|---|---|---|---|
| 2003/0095659 | A1* | 5/2003 | Ishihara | ............... H04L 9/001 380/46 |
| 2003/0159053 | A1* | 8/2003 | Fauble | ............... G06F 21/83 713/189 |
| 2004/0165726 | A1* | 8/2004 | Yamamichi | ............ H04L 9/085 380/277 |
| 2005/0071632 | A1* | 3/2005 | Pauker | ............... H04L 63/0442 713/165 |
| 2006/0072745 | A1* | 4/2006 | Fukaya | ............... G06F 21/606 380/28 |
| 2006/0280297 | A1* | 12/2006 | Fukaya | ............... H04L 9/0833 380/28 |
| 2008/0049937 | A1* | 2/2008 | Pauker | ............... H04L 63/0442 380/270 |
| 2008/0165972 | A1* | 7/2008 | Worthington | ............ H04L 51/00 380/278 |
| 2009/0241072 | A1* | 9/2009 | Chaudhri | ............ G06F 3/04883 715/863 |
| 2010/0115289 | A1* | 5/2010 | Han | .................. G06F 21/6209 713/189 |
| 2010/0278339 | A1* | 11/2010 | Frenkel | .................. G06F 21/62 380/210 |
| 2011/0117883 | A1* | 5/2011 | Drabo | .................. H04W 12/02 455/411 |
| 2011/0170689 | A1* | 7/2011 | Park | .................. H04L 9/32 380/247 |
| 2011/0296179 | A1 | 12/2011 | Templin et al. | |
| 2012/0210121 | A1 | 8/2012 | Boynton et al. | |
| 2012/0216041 | A1 | 8/2012 | Naono et al. | |
| 2012/0303964 | A1 | 11/2012 | Kim | |
| 2014/0115328 | A1* | 4/2014 | Allen | ................ H04L 29/06 713/165 |
| 2014/0310514 | A1* | 10/2014 | Favero | ............... H04L 63/0471 713/153 |
| 2015/0341166 | A1* | 11/2015 | Minematsu | ........... H04L 9/0631 380/28 |
| 2016/0314720 | A1* | 10/2016 | Kim | ........................ G06F 21/36 |

FOREIGN PATENT DOCUMENTS

| | | |
|---|---|---|
| CN | 101534311 A | 9/2009 |
| CN | 101593254 A | 12/2009 |
| CN | 101751522 A | 6/2010 |
| CN | 101753520 A | 6/2010 |
| CN | 102420821 A | 4/2012 |
| CN | 102436568 A | 5/2012 |
| CN | 103986837 A | 8/2014 |
| KR | 10-2010-0012567 | 2/2010 |
| KR | 10-2011-0083220 | 7/2011 |
| KR | 10-2012-0132013 | 12/2012 |
| KR | 10-1267875 | 5/2013 |
| WO | 02/17659 A1 | 2/2002 |

OTHER PUBLICATIONS

International Search Report dated Feb. 26, 2015 in connection with International Application No. PCT/KR2014/012591; 4 pages.
Written Opinion of the International Searching Authority dated Feb. 26, 2015 in connection with International Application No. PCT/KR2014/012591; 3 pages.
Communication dated Jul. 11, 2017 in connection with European Patent Application No. 14 87 1532.
Office Action dated Oct. 16, 2018 in connection with Chinese Patent Application No. 201480075439.9, 26 pages.
China National Intellectual Property Administration, "The Second Office Action," Application No. CN201480075439.9, dated Jul. 16, 2019, 25 pages.
Office Action dated Dec. 25, 2019 in connection with Chinese Patent Application No. 201480075439.9, 23 pages.
Communication pursuant to Article 94(3) EPC dated Apr. 1, 2020 in connection with European Patent Application No. 14 871 532.9, 5 pages.

* cited by examiner

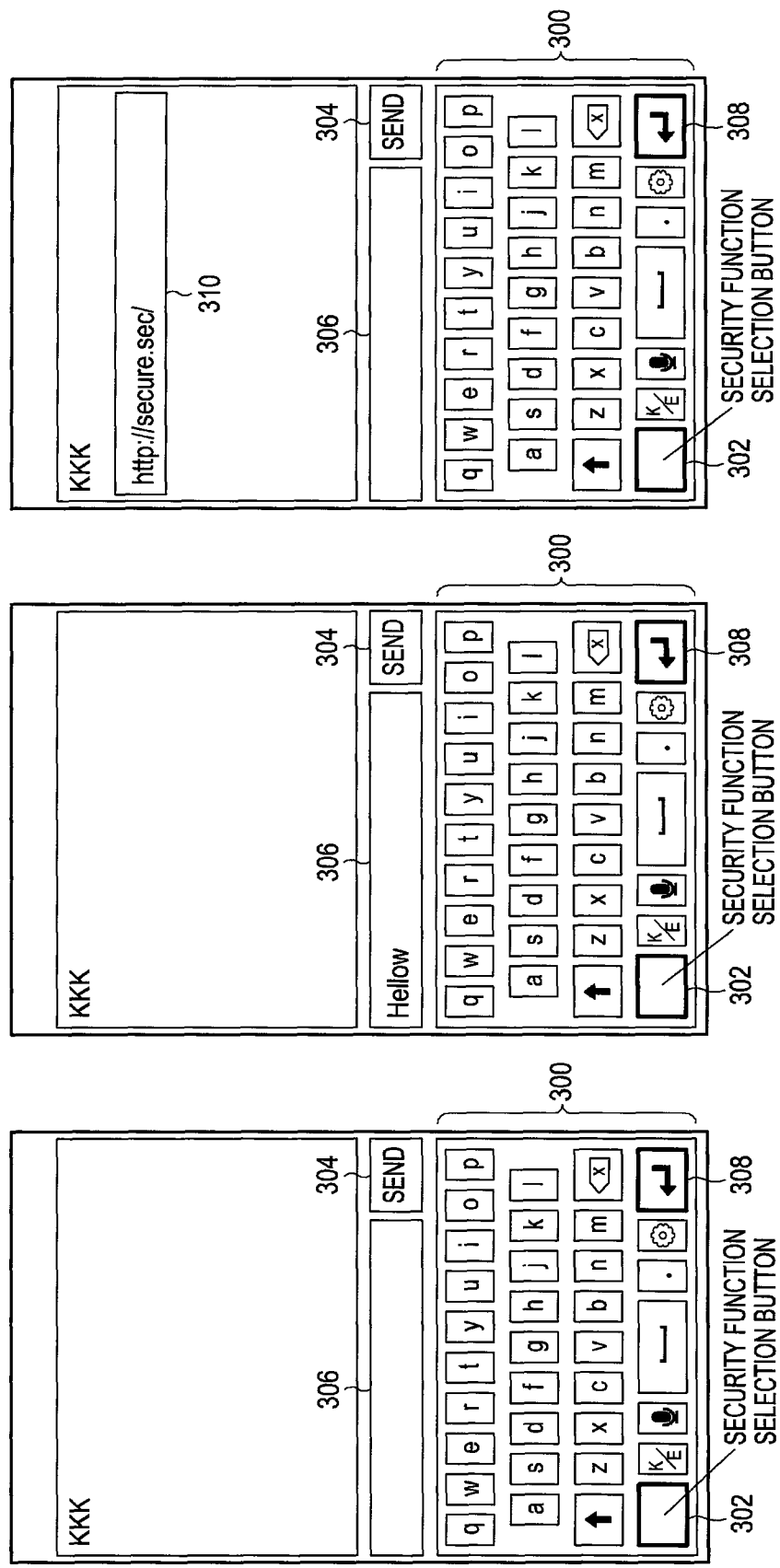

METHOD AND APPARATUS FOR TRANSMITTING AND RECEIVING ENCRYPTED MESSAGE BETWEEN TERMINALS

PRIORITY

This application is a National Phase Entry of PCT International Application No. PCT/KR2014/012591, which was filed on Dec. 19, 2014, and claims a priority to Korean Patent Application No. 10-2013-0160628, which was filed on Dec. 20, 2013, and claims a priority to Korean Patent Application No. 10-2014-0097193, which was filed on Jul. 30, 2014, the contents of which are incorporated herein by reference.

TECHNICAL FIELD

The present disclosure relates to a method and an apparatus for transmitting and receiving an encrypted message between terminals.

BACKGROUND

In a message transmission service provided between a transmission terminal and a reception terminal in a general mobile communication network, the following encryption in the unit of intervals is provided. For example, when the transmission terminal makes a message by using the message transmission service provided in the mobile communication network, the message is transmitted to the reception terminal via the mobile communication network. At this time, the encryption in the unit of intervals of each of intermediate paths through which the message passes, for example, an intermediate path between the transmission terminal and an intermediate communication network node, an intermediate path between the intermediate communication network node and a message server, and an intermediate path between the message server and the reception terminal is provided.

Meanwhile, a 3rd party message app (application) which can be used by a smart device recently generalized corresponds to a service through which a message is written in a transmission smart device and transmitted to a reception smart device via a mobile communication network or a wireless network such as Wi-Fi or the like. The 3rd party app is separately installed and used in each smart device, and mostly supports an encryption between a terminal in which the 3rd party app is installed and a message server.

The smart device that supports the message transmission service or the 3rd party app described above does not provide a particular supplement function to prevent a message from being leaked from a server, an intermediate node, and the like existing on a movement path.

When the aforementioned message transmission service in the mobile communication network is used, message leakage in a wireless section or a communication line can be prevented through an encryption between intermediate nodes but the message may be leaked from the corresponding node having received the message without any encryption. For example, a mobile communication femto cell base station has a relatively high risk of illegal extortion. When the message transmitted in the mobile communication network physically becomes closer to the femto cell, the message can be leaked. Further, a message server stores an encrypted message for a predetermined time, and the stored message may be reconstructed by the message server side and thus leaked.

Further, a 3rd party message app supports only an encryption between a transmission terminal or a reception terminal and the message server, that is, in a hop by hop type. In this case, a malicious user cannot extort the message during a transmission/reception path of the corresponding message, but the message can be leaked through the server.

Further, the message finally transmitted to the terminal may be directly exposed to another user when the message is checked through a terminal screen in a public place. In this case, when highly important personal information or financial information such as an account number is transmitted through a message, a method of blocking a final output of the message from another person's view is needed.

SUMMARY

Embodiments of the present disclosure propose a security method of preventing message leakage from a server or an intermediate node included in a path of the message transmitted and received between smart devices. Accordingly, embodiments of the present disclosure propose a smart device including secure keyboard software capable of transmitting encrypted text in a message writing and identifying process generated during the use of a message transmission service.

Further, embodiments of the present disclosure propose a smart device that, when a message received through a message transmission service is encrypted text, calls an application which can decrypt the encrypted text.

In accordance with a method for transmitting an encrypted message at a transmission device, the method comprising: if a first user input to run a message application is detected, displaying a keyboard suppronting a security mode; detecting a second user input to select the security mode; switching to the security mode in response to the second user input, and then receiving a message input by a user and temporarily storing the message; if a writing completion instruction of the message is detected on the keyboard, encrypting the message; and transmitting, to a reception device, the encrypted message.

In accordance with another method for receiving an encrypted message at a reception device, the method comprising: receiving, from a transmission device, the encrypted message; if a user input for the encrypted message is detected, determining whether a pattern mapped to decryption software is included in the encrypted message; and if the pattern is included in the encrypted message, executing the decryption software to decrypt an original message extracted from the encrypted message and displaying the decrypted original message.

In accordance with an apparatus according to an embodiment of the present disclosure, a transmission device for transmitting an encrypted message, the transmission device comprising: if a first user input to run a message application is detected, displaying a keyboard supporting a security mode; contoller configured to detect a second user input to select the security mode, switch to the security mode in response to the second user input, and then receiving a message input by a user and temporarily storing the message, if a writing completion instruction of the message is detected on the keyboard, encrypt the message; and a transceiver configured to transmit, to a reception device, the encrypted message.

In accordance with an apparatus according to an embodiment of the present disclosure, a reception device for receiving an encrypted message, the reception device comprising: a transceiver configured to receive, from a transmission device, the encrypted message; and if a user input for the encrypted message is detected, a controller configured to determine whether a pattern mapped to decryption software is included in the encrypted message, and if the pattern is included in the encrypted message, execute the decryption software to decrypt an original message extracted from the encrypted message and control a display displaying the decrypted original message.

BRIEF DESCRIPTION OF THE DRAWINGS

FIG. 3A illustrates an example in which a message app 102 is executed on a display screen of a smart device;

FIG. 3B illustrates a case where a user inputs a message into an input window of a keyboard SW operating in a security mode according to an embodiment of the present disclosure;

FIG. 3C illustrates an example in which encrypted text is displayed on the display screen of the transmission terminal according to an embodiment of the present disclosure;

DETAILED DESCRIPTION

Figure 1:
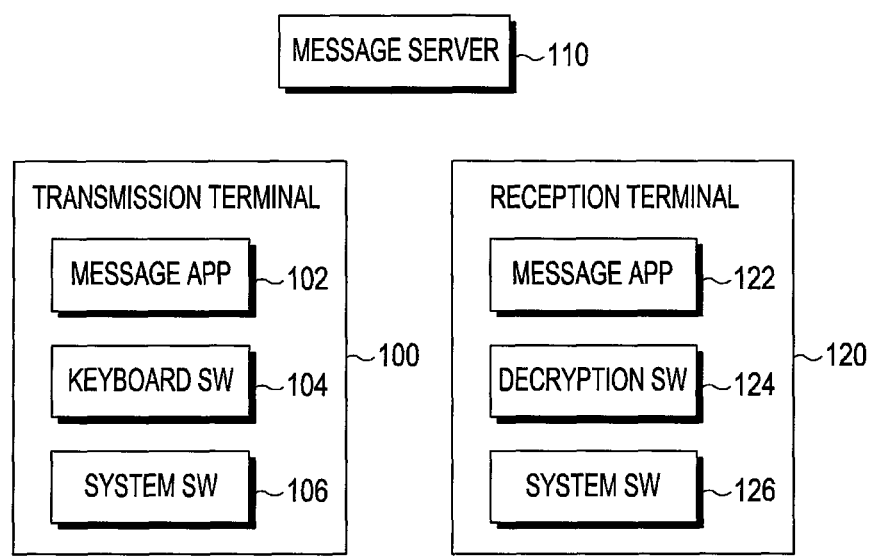
FIG. 1 illustrates an example of a configuration diagram of all devices for transmitting and receiving an encrypted message between mobile terminals according to an embodiment of the present disclosure.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, embodiments of the present disclosure propose a security method of preventing message leakage from a server or an intermediate node included in a path of the message transmitted and received between smart devices. Hereinafter, a smart device according to embodiments of the present disclosure may include devices in the form of a terminal, a tablet, or a wearable device having a mobile communication function. The wearable device may have the form of, for example, glasses or a clock. More specifically, embodiments of the present disclosure propose a smart device including secure keyboard software capable of transmitting encrypted text in a message writing and identifying process generated during a message transmission service process. Further, embodiments of the present disclosure propose a smart device that, when a message received through a message transmission service is encrypted text, calls an application which can decrypt the encrypted text.

FIG. 1 illustrates an example of a configuration diagram of all devices for transmitting and receiving encrypted message between mobile terminals according to an embodiment of the present disclosure.

Referring to FIG. 1, a transmission terminal 100 and a reception terminal 120 correspond to smart devices which can use a message transmission service provided through a message server 110 or transmit and receive a message through a 3rd party message app. Further, roles of the transmission terminal 100 and the reception terminal 120 may be exchanged according to locations of a source and a target for transmission and reception of the corresponding message.

First, the transmission terminal 100 may include a message app 102, keyboard software (SW) 104, and system SW 106. The elements of the transmission terminal 100 are only examples for convenience of the description, and detailed elements may be integrated into one unit or subdivided into other subunits. In message transmission and reception with the reception terminal 120 according to an embodiment of the present disclosure, the keyboard software 104 supports the generation of encrypted text in order to prevent leakage of the corresponding message from some nodes included in a transmission/reception path. In a concrete example, when the keyboard SW 104 detects a user input such as a touch or the like made into a character input window through a character input UI (User Interface) provided by the message app, the keyboard SW 104 recognizes reception of the character input from a user. Then, the keyboard SW 104 may provide a selection button for a security function capable of instructing to generate the encrypted text. An operation of each element of the transmission terminal 100 will be described in detail with reference to FIG. 2. Hereinafter, in embodiments of the present disclosure, a "touch" may be described as a user input for convenience of the description. Here, the touch may include an action such as a click, a drag, clicks made a predetermined number of times, clicks for a predetermined length of time, or the like.

Figure 2:
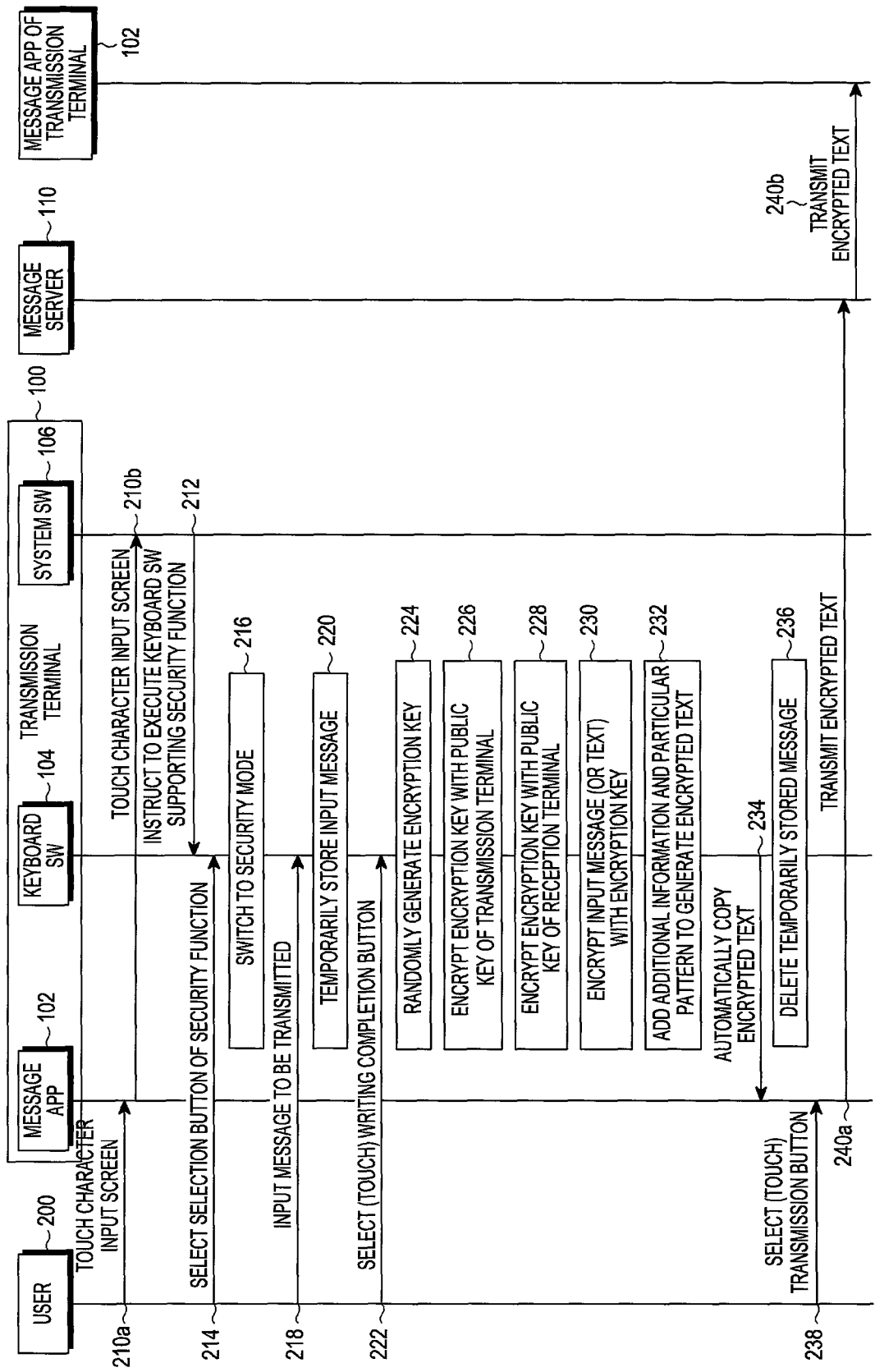
FIG. 2 is a flowchart of an operation in which a transmission terminal transmits an encrypted message according to an embodiment of the present disclosure.

FIG. 2 illustrates an example of a flowchart of an operation in which the transmission terminal transmits an encrypted message according to an embodiment of the present disclosure. For convenience of the description, it is assumed that the transmission terminal and the message server correspond to the transmission terminal 100 and the message server 110 of FIG. 1.

Referring to FIG. 2, for example, it is assumed that a user 200 makes a user input into a character input window through a character input UI provided by the message app 102 of the transmission terminal 100 in step 210*a*. Accordingly, when the message app 102 of the transmission terminal 100 detects a user input such as a touch or the like, the user input is transferred to the system SW 106 of the transmission terminal 100. The system SW 106 having detected the user input instructs the keyboard SW 104 to execute keyboard SW that supports a security function according to an embodiment of the present disclosure in step 212.

Thereafter, when the keyboard SW that supports the security function is executed on the message app 102, the transmission terminal 100 activates a button for selecting the security function provided by the keyboard SW on a display screen.

FIG. 3A illustrates an example in which the message app 102 is executed on a display screen of a smart device.

Referring to FIG. 3A, a keyboard 300 provided by a user input of the user 200 provides a selection button 302 according to an embodiment of the present disclosure. Further, when a touch input of the selection button by the user 200 is detected in step 214, the keyboard SW 104 recognizes that an instruction to generate encrypted text to be transmitted has been input. Then, the keyboard SW 104 switches to a security mode in step 216. Meanwhile, according to another embodiment of the present disclosure, it is assumed that basic settings of the message app 102 or basic settings of the transmission terminal 100 are configured as the security mode. In this case, when a touch on the input window by the user 200 is detected, the system SW 106 executes the keyboard SW 104. Accordingly, the keyboard SW 104 may switch to the security mode even though a user input of the additional security function selection button by the user 200 is not detected. When the basic settings are configured as the security mode and the user input on the input window by the user 200 is detected, the keyboard SW 104 may insert a parameter for displaying the security mode into the message transferred to the message app 102 or the system SW 106. Here, it is assumed that a message to be transmitted is input by the user 200 through a user input window (corresponding to reference numeral 306 of FIG. 3A) in a state where the keyboard SW 104 has switched to the security mode in step 218. In this case, when the message input by the user 200 is detected through the user input window, the keyboard SW 104 temporarily stores the input message in step 220.

FIG. 3B illustrates an example of a display screen when the user inputs a message into an input window of the keyboard SW operating in the security mode according to an embodiment of the present disclosure.

Referring to FIG. 3B, for example, a case where the user 200 inputs a message of "hellow" into a user input window 306 is illustrated. At this time, the keyboard SW 104 shows a message currently input only through the user input window 306 and temporarily stores the corresponding message. Thereafter, in step 222, the keyboard SW 104 detects a user input of the user 200 such as a touch on a writing completion button 308 provided through the keyboard 300 in step 222 as illustrated in FIG. 3B. Then, the keyboard SW 104 having detected the user input encrypts the text, that is, "hellow" input by the user 200 through steps 224 to 230. More specifically, the keyboard SW 104 randomly generates an encryption key in step 224, and encrypts the generated encryption key with an already known public key of the transmission terminal 100 to generate a first encryption key in step 226. Further, the keyboard SW 104 encrypts the encryption key with an already known public key of the reception terminal 120 to generate a second encryption key in step 228. The keyboard SW 104 encrypts the message, that is, "hellow" with the generated encryption key in step 230. The keyboard SW generates encrypted text in a character string type including the message encrypted with the first encryption key, the second encryption key, and the randomly generated encryption key in step 232. For example, the character string may include a URL (Uniform Resource Locator) address type character string (for example, "http://" or "https://") and a symbol type string. Further, the character string may include a predetermined particular pattern for additional information mapped to decryption SW. The particular pattern may include, for example, "http://secure.sec". As a result, the encrypted text may include the first encryption key generated by encrypting the encryption key with the public key of the transmission terminal 100 and the second encryption key generated by encrypting the encryption key with the public key of the reception terminal 120. Accordingly, the keyboard SW 104 may express the encrypted text as "http://secure.sec/info?enc_key_by_sender_key=Hxbaabxxe&enc_key_by_receiver_key=Gxaabbccef&enc_text_by_key= Abcdeghkbabcadfassfgwegasgsdgfagfaaqweuivdksdfr". Here, "enc_key_by_sender_key=Hxbaabxxe&enc" indicates the first encryption key, "enc_key_by_receiver_key=Gxaabbccef" indicates the second encryption key, and "enc_text_by_key=Abcdeghkbabcadfassfgwegasgsdgfagf aaqweuivdksdfr" indicates the message encrypted with the randomly generated encryption key. Further, the additional information may include information on an encryption key (=session key) for the encrypted text. The keyboard SW 104 may generate the session key randomly whenever the encryption is performed. In step 234, the keyboard SW 104 copies the generated encrypted text to the message app 102. Then, in step 236, the keyboard SW 104 deletes the temporarily stored message.

Thereafter, in step 238, the message app 102 detects a user input such as a touch of the user 200 for selecting a transmission button on a keyboard provided by the message app 102.

FIG. 3C illustrates an example in which the encrypted text is displayed on the display screen of the transmission terminal according to an embodiment of the present disclosure.

Referring to FIG. 3C, the message app 102 detects a user input of the transmission button 304 provided by the user 200 through the keyboard 300. Then, the text 310 encrypted through steps 224 to 232 described above is displayed on the display screen. Further, the message app 102 of the transmission terminal 100 having detected the user input such as the touch of the transmission button transfers the encrypted text to the message app 122 of the reception terminal through the message server 110 in steps 240a to 240b. Then, similar to the display screen of FIG. 3c, the display screen of the reception terminal also displays the encrypted text.

The message server 110 serves to receive the encrypted text from the transmission terminal 100 and to transfer the received text to the reception terminal 120 according to an embodiment of the present disclosure.

The reception terminal 120 includes, for example, the message app 122, the decryption SW 124, and the system SW 126. The elements of the reception terminal 120 are only examples for convenience of the description, and detailed elements may be integrated into one unit or subdivided into other subunits.

Figure 4A:
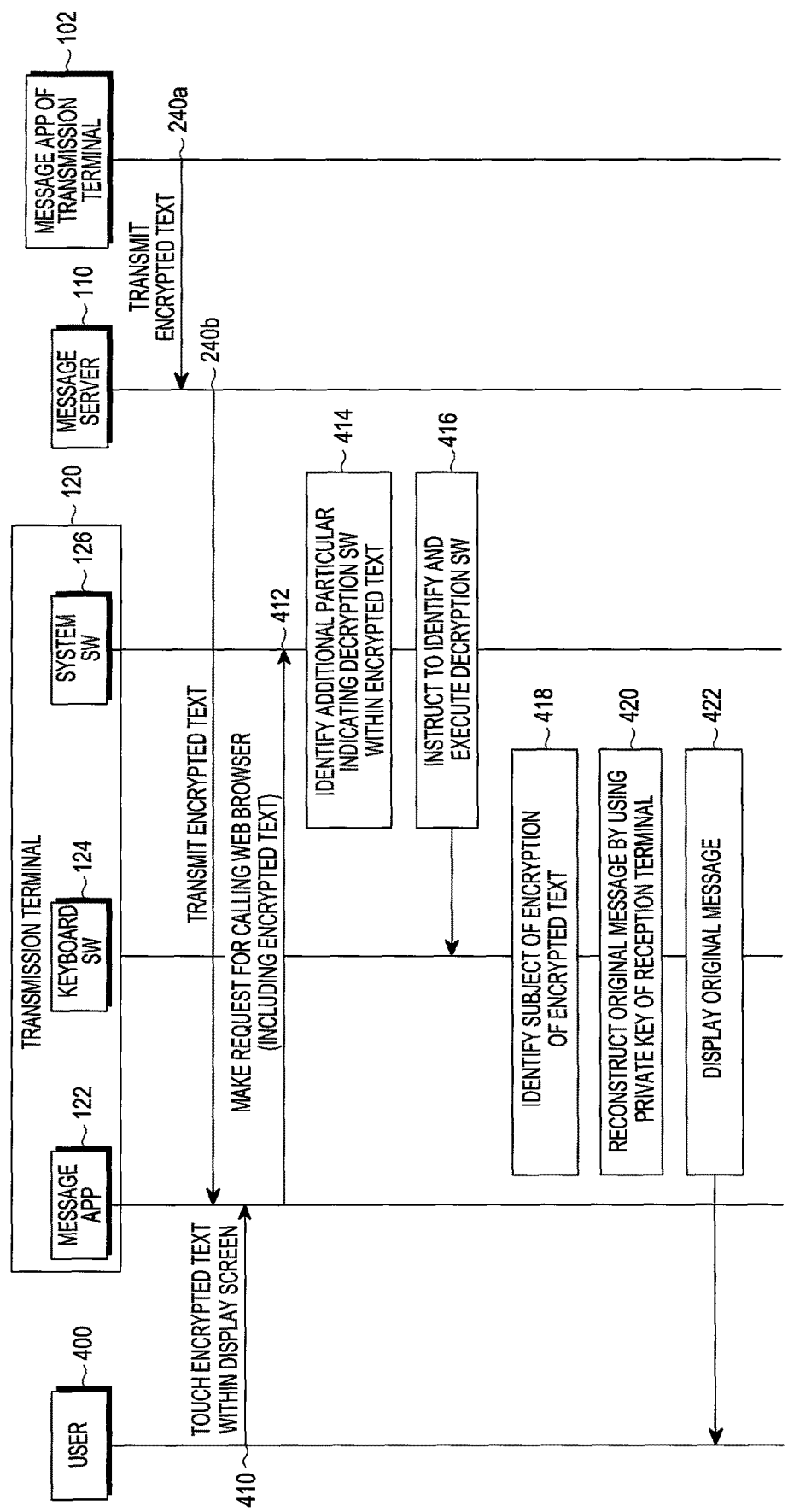
FIG. 4A is a flowchart of an operation in which a reception terminal decrypts the encrypted message according to an embodiment of the present disclosure.

FIG. 4A illustrates an example of a flowchart of an operation in which the reception terminal decrypts an encrypted message according to an embodiment of the present disclosure. For convenience of the description, it is assumed that the reception terminal and the message server correspond to the reception terminal 120 and the message server 110 of FIG. 1.

Referring to FIG. 4A, it is assumed that the encrypted text transmitted by the transmission terminal 100 has been received by the message app 122 of the reception terminal 120 through the message app 102 of the transmission terminal 100 and the message server 110 in steps 240a to 240b of FIG. 2A. Through the operation of the transmission device described above, the encrypted text corresponds to text which has been encrypted according to a security function selected when the user executes the message app of the transmission terminal according to an embodiment of the present disclosure and the encrypted text may be expressed in a URL type address including the additional information and particular pattern described above.

It is assumed that the reception terminal 120 detects a user input of the user 400 such as a touch on the displayed encrypted text in a state where the message app 122 is executed on the display screen of the reception terminal 120 in step 410. Then, the message app 122 having detected the touch transfers a request for calling a web browser corresponding to the encrypted text to the system SW 126 in step 412. At this time, the call request includes the encrypted text.

The system SW 126 having received the call request identifies whether the encrypted text included in the call request has a particular pattern in step 414. For example, the particular pattern may be included in a URL address type such as "http://", "https://", or the like, and may include an additional particular pattern, for example, "http://secure.sec" mapped to the decryption SW. The system SW 126 according to an embodiment of the present disclosure stores in advance the decryption SW for decrypting the encrypted text according to each particular pattern. When the additional particular pattern exists based on a result of the identification, the system SW 126 instructs to execute the decryption SW 124 stored in advance in step 416. The particular pattern corresponds to a normal URL address indicating a connection to a particular web browser. Accordingly, when the additional particular pattern is not included based on a result of the identification, the system SW 126 executes the web browser corresponding to the URL address.

In step 418, the decryption SW 124 having received the instruction identifies a subject of the encryption of the "encrypted text" to be decrypted. At this time, the encrypted text includes the first encryption key generated by encrypting the randomly generated encryption key with the public key of the transmission terminal 100 and the second encryption key generated by encrypting the randomly generated encryption key with the public key of the reception terminal 120 as described above. A process of identifying the subject of the encryption is described below. Specifically, the decryption SW 124 decrypts each of the first encryption key and the second encryption key by using a private key of the reception terminal 120 stored in advance. Further, a terminal having a successfully decrypted encryption key is determined as the subject of the encryption. For example, it is assumed that the second encryption key has been successfully decrypted and thus the reception terminal 120 is identified as the subject of the encryption. Then, the decryption SW 124 decrypts the encrypted message within the encrypted text by using a randomly generated encryption key, acquired through the decryption of the second encryption key in step 420. Further, the decryption SW 124 makes a control to display the decrypted original message on the display screen of the reception terminal 120 in step 422. At this time, according to an embodiment, the decrypted original message may be displayed on the screen where the message app 122 is executed, or displayed through a separate partial window such as a pop up window or the like on the display screen of the reception terminal 120. Further, according to another embodiment, a lock function may be added so that the decrypted original message can be identified only by limited users.

Figure 4B:
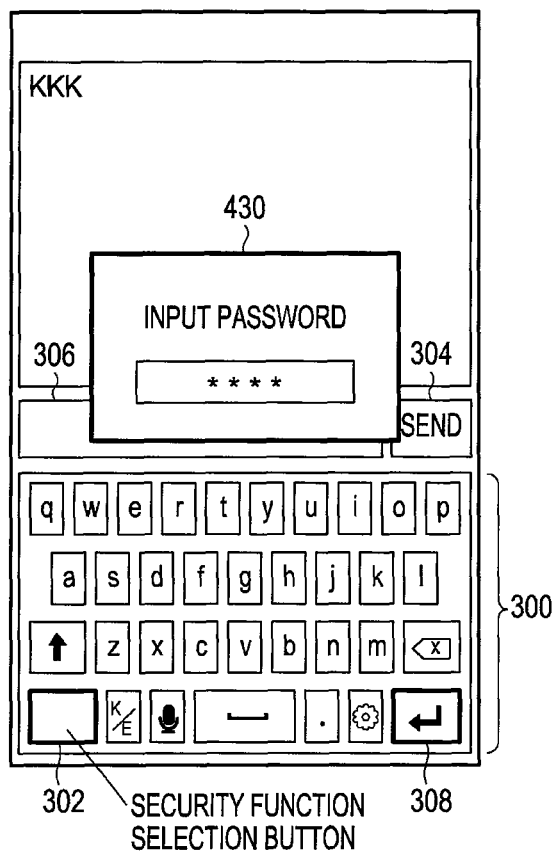
FIG. 4B illustrates an embodiment to which a lock function for identifying the decrypted original message is applied according to another embodiment of the present disclosure.

FIG. 4B illustrates an embodiment of a display screen to which the lock function for identifying the decrypted original message is applied according to another embodiment of the present disclosure.

Referring to FIG. 4B, for convenience of the description, it is assumed that a screen where the message app of the reception terminal 120 is executed is displayed on the screen of FIG. 3C as an example. As described above, it is assumed that the original message of the encrypted message has been completed decrypted through step 420 of FIG. 4A. Then, for example, a partial window 430 for a password input is overlaid, in a popup window form, on the screen where the message app of the reception terminal 120 is executed.

Figure 4C:
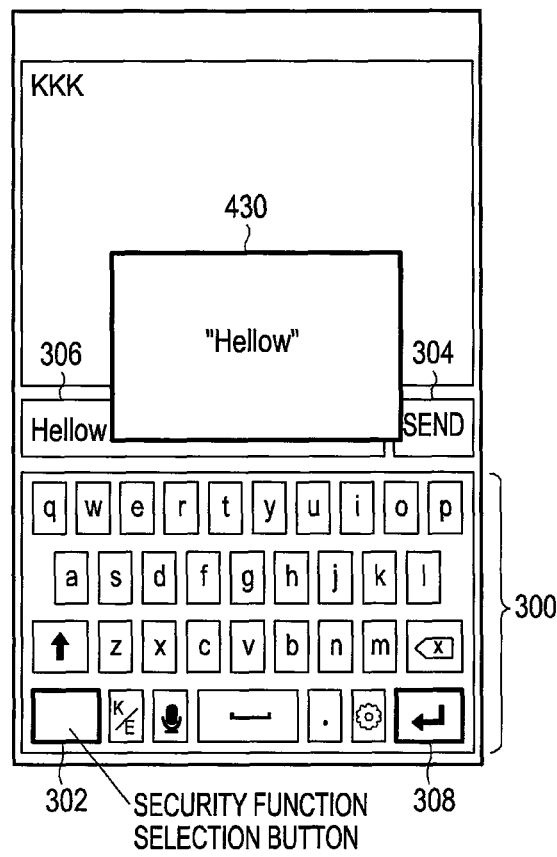
FIG. 4C illustrates an example of the display screen where the decrypted original message to which the lock function is applied is displayed according to another embodiment of the present disclosure.

In this case, the decryption SW 124 of the reception terminal 120 may ask a predetermined user to input the password to identify the original message through the partial window 430. Thereafter, when it is detected that the password corresponding to a preset password is input by the user, the decryption SW 124 displays the original message of the encrypted text, that is, "hellow" on the partial window 430 based on an assumption of the embodiment of FIG. 3B. as illustrated in FIG. 4C. Even though the original message is decrypted as illustrated in FIGS. 4B to 4C, the decrypted original message is displayed only when a preset password is input, so that there is an advantage such as a further tightened security function. In message transmission using the message app, the transmission terminal according to the embodiment of the present disclosure described above may transmit the encrypted text to the receiving side by using a keyboard SW that supports the security function according to an embodiment of the present disclosure.

Meanwhile, the encrypted text is left on the display window where the message app of the transmission terminal is executed. Thereafter, if it is detected that the decryption of the encrypted text is requested, the decryption SW 124 identifies the subject of the encryption of the encrypted text to be decrypted like in step 418 of FIG. 4, and extracts and decrypts the encryption key encrypted with the public key included in the encrypted text.

Figure 5:
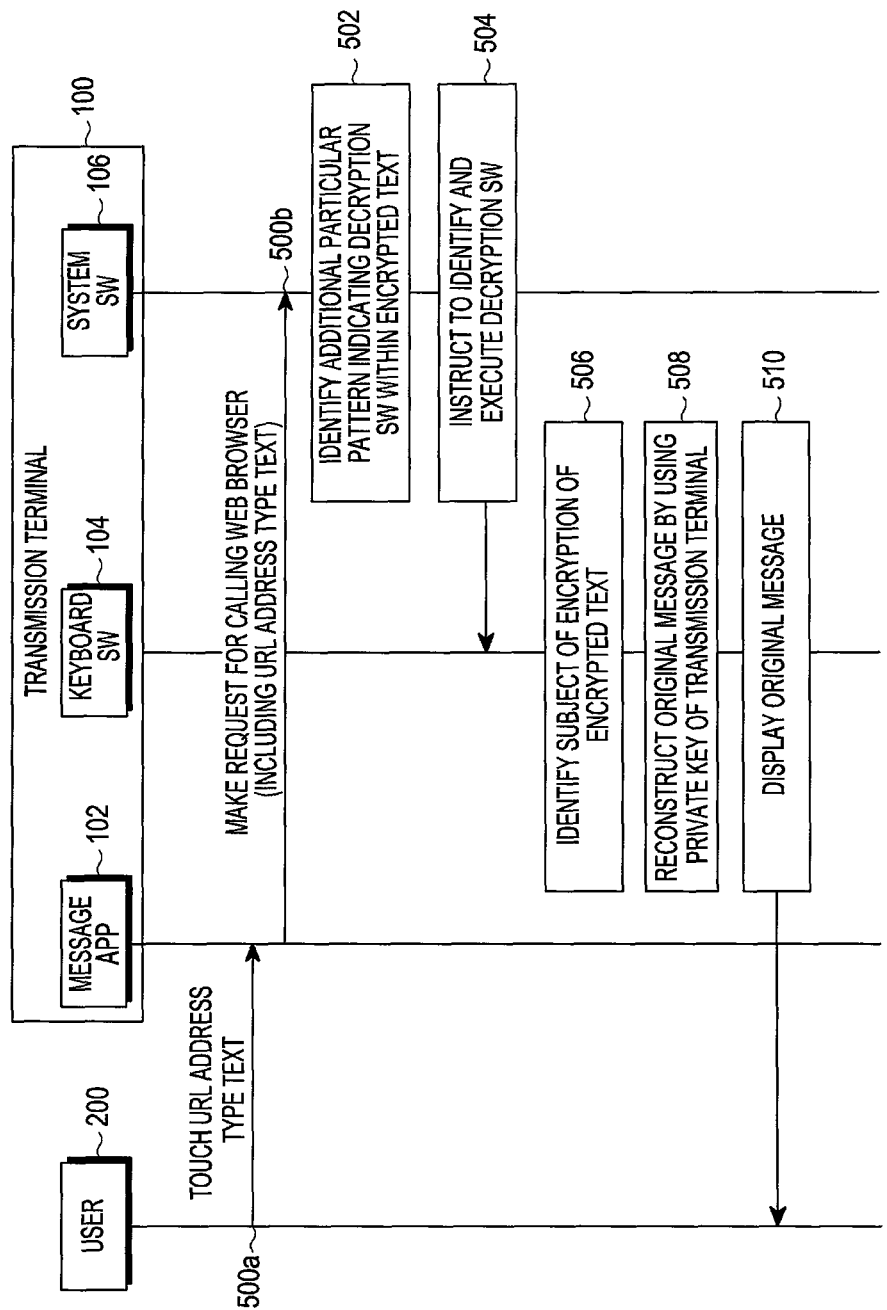
FIG. 5 is a flowchart of an operation in which the transmission terminal decrypts the encrypted message according to another embodiment of the present disclosure.

FIG. 5 illustrates an example of a flowchart of an operation in which the transmission terminal decrypts an encrypted message according to another embodiment of the present disclosure. For convenience of the description, it is assumed that the transmission terminal and the message server correspond to the transmission terminal 100 and the message server 110 of FIG. 1.

Referring to FIG. 5, it is assumed that the message app 102 detects a user input of the user 200 on a pre-transmitted encrypted message in a URL address type displayed on the display window of the transmission terminal 100 where the message app 102 is executed in step 500a. Then, the message app 102 having detected the user input of the encrypted message in the URL address type transfers a request for calling a web browser corresponding to the URL address to the system SW 106 in step 500b. At this time, the request for calling the web browser includes the URL address.

Then, the system SW 106 identifies whether an additional particular pattern mapped to the decryption SW is included in the URL address in step 502. When the additional particular pattern is not included, the system SW 106 executes the web browser corresponding to the URL address on the display screen of the transmission terminal 100.

When the additional particular pattern is included based on a result of the identification, the system SW 106 recognizes that the URL address corresponds to encrypted text, identifies the pre-stored decryption SW 104, and transmits an execution instruction to the decryption SW 104 in step 504. In step 506, the decryption SW 104 having received the instruction identifies a subject of the encryption of the "encrypted text" to be decrypted in step 506. At this time, the encrypted text includes the first encryption key generated by encrypting the randomly generated encryption key with the public key of the transmission terminal 100 and the second encryption key generated by encrypting the randomly generated encryption key with the public key of the reception terminal 120 as described above. The identification process is described as below. Specifically, the decryption SW 124 decrypts each of the first encryption key and the second encryption key by using a private key of the transmission terminal 100 stored in advance. Further, a terminal having a successfully decrypted encryption key is determined as the subject of the encryption. For example, it is assumed that the first encryption key has been successfully decrypted and thus the transmission terminal 100 is identified as the subject of the encryption. Then, the decryption SW 104 decrypts the encrypted message within the encrypted text by using a randomly generated encryption key in step 508. Further, the decryption SW 124 makes a control to display the decrypted original message on the display screen of the transmission terminal 100 in step 510. FIG. 5 illustrates a case where the decrypted original message is displayed on the display screen of the transmission terminal 100 according to an embodiment as an example. However, according to another embodiment, the decrypted message may be displayed on the popup type partial window of the display screen as illustrated in FIGS. 4B and 4C. The popup window requests an input of a password according to a preset lock function and, only when the input of a password corresponding to a preset password is detected, may display the decrypted message on the popup window.

According to the aforementioned embodiment of the present disclosure, each of the transmission terminal and the reception terminal includes the decryption SW for decrypting encrypted text through keyboard SW that supports the security function of the message app, and the encrypted text is decrypted using the randomly generated encryption key acquired by decrypting, with the private key, the encryption key encrypted with the public key based on the decryption SW.

According to another embodiment of the present disclosure, the encrypted text may be decrypted through a separate device, for example, a decryption web server or an external device which stores a terminal-specific public key, private key, and decryption SW in advance. Accordingly, the decrypted original message may be displayed through a display screen of the external device. Here, the external device may be defined as a separate device which can be connected with a terminal to/from which the encrypted text is transmitted/received (hereinafter, referred to as a "main terminal") wirelessly through Bluetooth or through a wired cable. For example, the external device is a device having Bluetooth therein which is compatible with the terminal to/from which the text encrypted through the message app is transmitted/received and corresponds to devices having a display screen such as a Personal Computer (PC), a tablet, a wearable device, and the like. Further, when the external device is connected to the main terminal to/from which the text encrypted through the message app is transmitted/received, an original message included in the encrypted text may be decrypted under a control of the main terminal and the original message may be displayed through the display screen of the external device.

Accordingly, the terminal according to another embodiment of the present disclosure identifies whether a URL address included in a web browser call request received from the message app indicates a general web browser or encrypted text through the existing system SW without any separate decryption SW. When the URL address indicates the general web browser based on a result of the identification, a display screen where the corresponding web browser is executed is provided to the user through a web browser execution unit within the terminal. Further, when the URL address indicates the encrypted text, the system SW transfers the URL address to the external device including the decryption SW. At this time, it is assumed that the external device already stores a public key and a private key for each of terminals that transmit and receive data encrypted through the message app.

Figure 6:
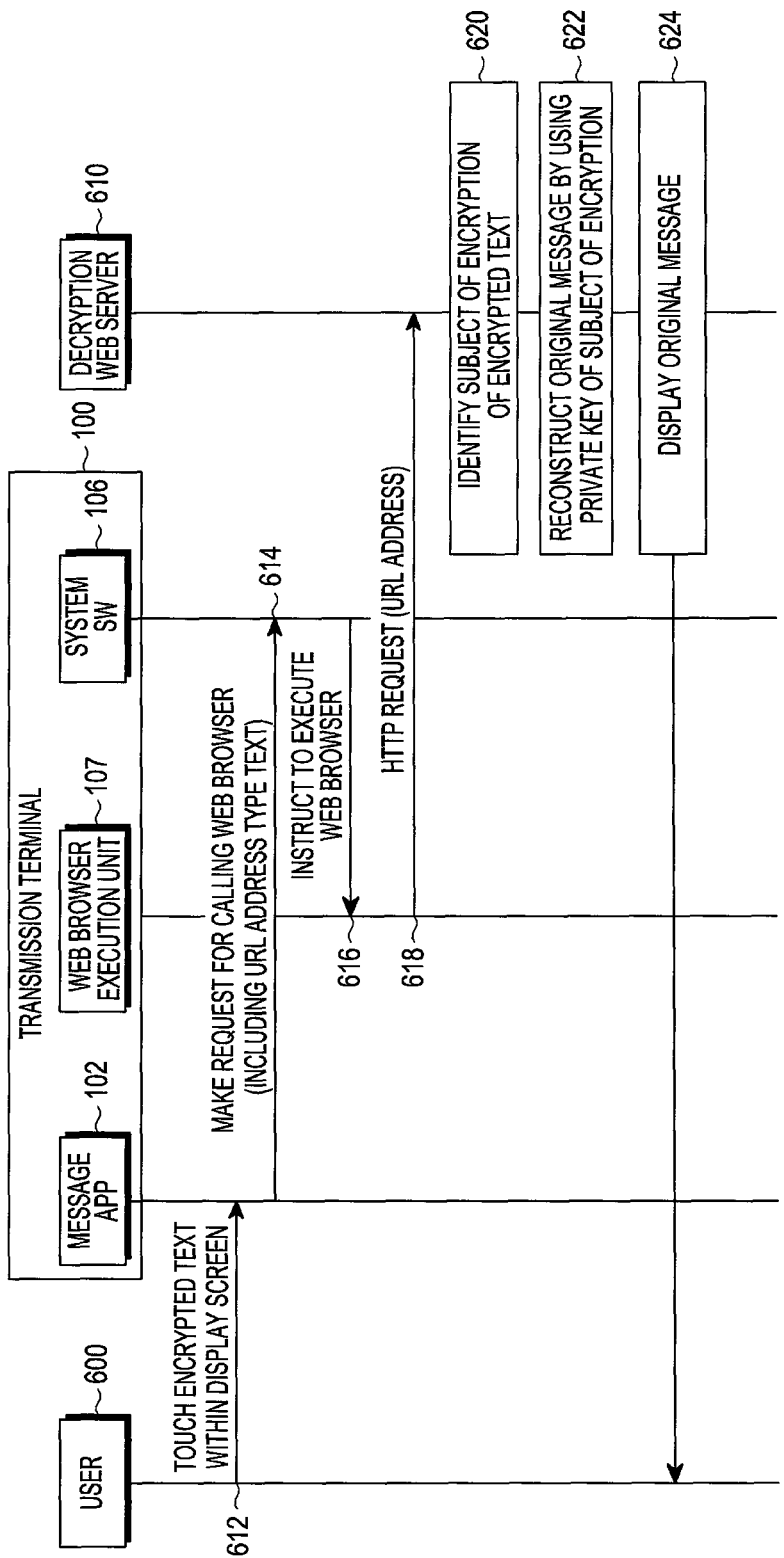
FIG. 6 is a flowchart of an operation in which the transmission terminal decrypts the encrypted message according to another embodiment of the present disclosure.

FIG. 6 illustrates an example of a flowchart of an operation for decrypting encrypted data by an external device through a message app according to another embodiment of the present disclosure. For convenience of the description, it is assumed that the transmission terminal 100 of FIG. 1 operates.

Referring to FIG. 6, it is assumed that the message app 102 detects a user input of a user 600 of pre-transmitted URL address type encrypted text displayed on the display window of the transmission terminal 100 where the message app 102 is executed in step 612. Then, the message app 102 having detected the user input of the URL address type encrypted text transfers a request for calling a web browser corresponding to the URL address of the encrypted text to the system SW 106 in step 614. At this time, the request for calling the web browser includes the URL address. The system SW 106 identifies whether an additional particular pattern is included in the URL address. When the additional particular pattern is not included based on a result of the identification, the system SW 106 of the transmission terminal 100 determines that the URL address is information indicating a general web browser, and transfers a web browser execution instruction to a web browser execution unit 107 within the transmission terminal 100 in step 616. Here, although the web browser execution unit 107 is illustrated as a separate element within the transmission terminal 100 as an example, the web browser execution unit 107 can be configured as a part within the system SW 106. The web browser execution unit 107 executes the corresponding web browser on the display screen of the transmission terminal 100 according to the instruction. Further, in step 618, the web browser execution unit 107 transfers an HTTP request including the URL address to a decryption web server 610 as an example of the above described external device.

Then, in step 620, the decryption web server 610 identifies a subject to encrypt the URL address. Here, since a process of identifying the subject of the encryption is the same as step 418 of FIG. 4, a detailed description will be omitted. When the subject of the encryption is identified, the decryption web server 610 decrypts an encrypted original message within the encrypted text by using a randomly generated encryption key in step 622. Further, the decryption web server 610 displays the decrypted original message on the display screen of the transmission terminal 100 to transfer it to the user 600 in step 624. In this case, the decrypted message may be overlaid as a separate partial window in a popup type on the display screen where the message app 102 is executed, and the lock function may be applied to display the decrypted message only when a preset password is input as described above. Further, according to another embodiment, the decrypted original message may be transferred to the user 600 through the display screen included in the decryption web server 610 according to a control of the decryption web server 610.

As described above, the present disclosure may provide an End-to-End encryption in a 3rd party app without any change in the conventional scheme. Accordingly, even though the message is stored in the corresponding server, user's privacy can be protected since the message is encrypted in the unit of End-to-End.

Meanwhile, when a memo app is executed and encrypted instead of the message app 120 among the elements of the transmission terminal 100 of FIG. 1, text written by the memo app may be safely stored and decrypted in addition to the message encryption between mobile terminals, and thus privacy-related information may be stored. Particularly, when the encrypted message written through the memo app is decrypted by an external device, the leakage of the corresponding message in public places can be prevented. Hereinafter, similar to the above description, the external device according to an embodiment may also be a separate device which can be connected to a main terminal wirelessly or through a wire that encrypts a message or text according to an embodiment of the present disclosure. The external device corresponds to a device which may display a result of the encryption of the main terminal on a display screen according to a control of the main terminal. For example, the external device may be defined as an auxiliary terminal corresponding to a wearable device such as glasses or a clock and, for example, the main terminal and the auxiliary terminal may be paired through Bluetooth.

Figure 7:
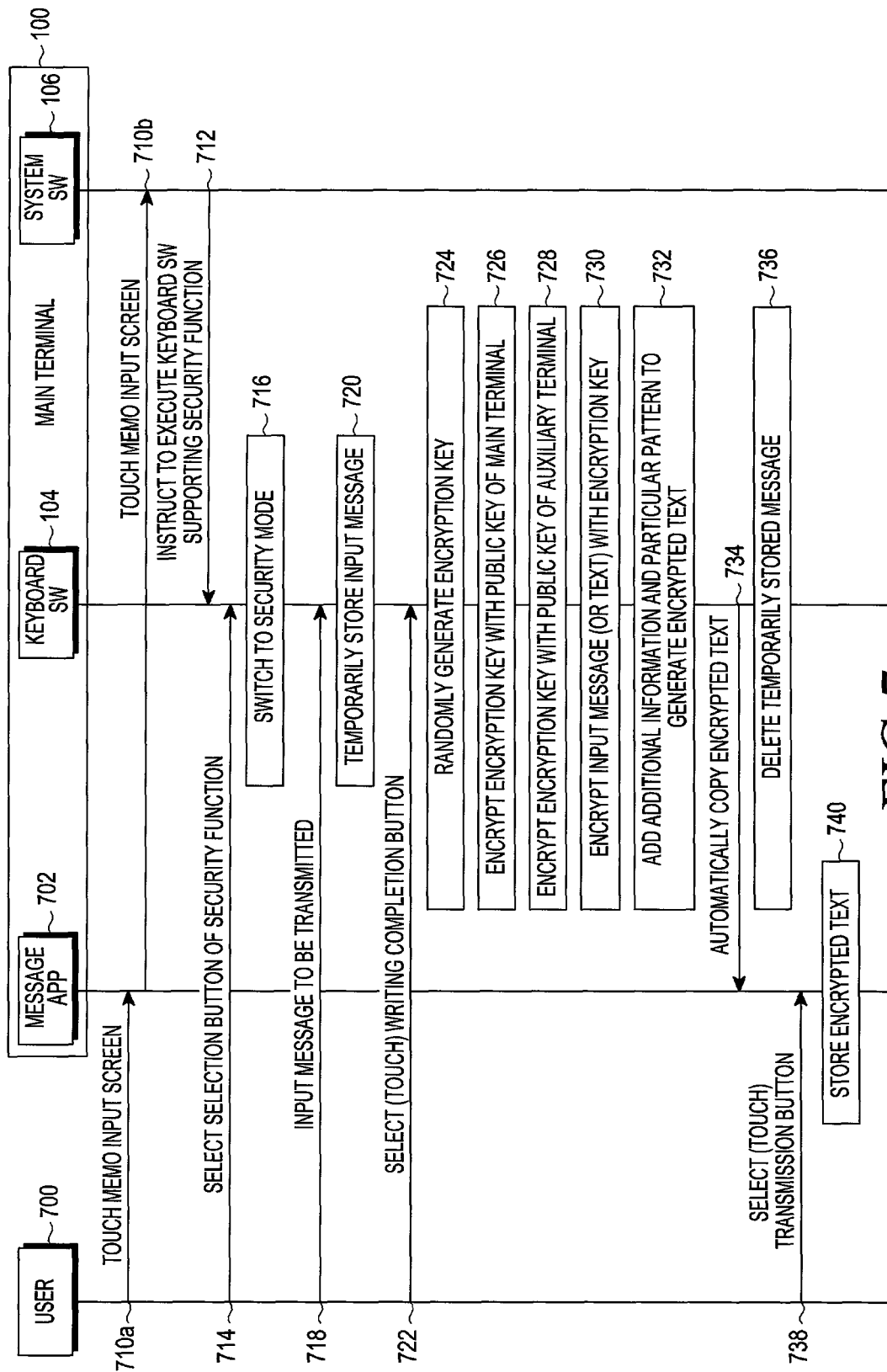
FIG. 7 illustrates an example of a flowchart of an operation in which the terminal inputs and encrypts the encrypted message in a memo app according to another embodiment of the present disclosure.

Such a procedure will be described based on FIGS. 7 to 9. Hereinafter, in embodiments of FIGS. 7 to 9, the main terminal and the auxiliary terminal correspond to the transmission terminal 100 and the reception terminal 120, respectively, for convenience of the description. FIG. 7 illustrates an example of a flowchart of an operation in which the terminal inputs and encrypts an encrypted message in a memo app according to another embodiment of the present disclosure. Here, the main terminal 100 may include, for example, a memo app 702, the keyboard SW 104, and the system SW 106.

Referring to FIG. 7, it is assumed that a user 700 executes the memo app 702 of the main terminal 100 and thus a memo input screen is displayed on a screen of the main terminal. Further, in step 710*a*, the memo app 702 detects a user input on the memo input screen from the user 700. Then, the system SW 106 having recognized user input information provided through the memo input screen in step 710*b* instructs to execute the keyboard SW 104 that supports a security function in step 712. Thereafter, since steps in which the main terminal 100 writes an encrypted message, that is, steps 714 to 732 are the same as steps 214 to 232 of FIG. 2, a detailed description will be omitted.

Thereafter, in step 734, the keyboard SW 104 copies encrypted text through the memo app 702. Then, in step 736, the keyboard SW 104 deletes the temporarily stored message.

Thereafter, it is assumed that the memo app 702 detects a user input of the user 700 for selecting a storage button of the keyboard provided by the memo app 702 in step 738. Then, in step 704, the memo app 702 stores the encrypted text.

Figure 8:
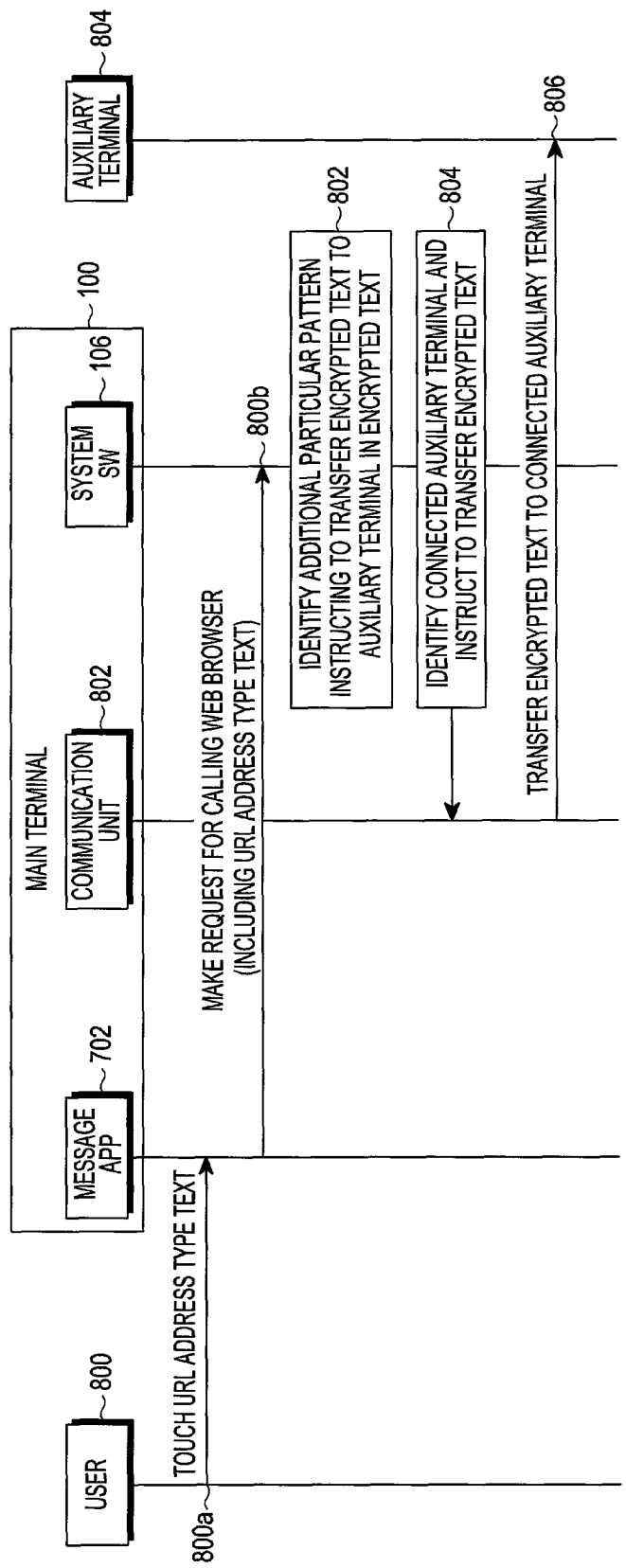
FIG. 8 illustrates an example of a flowchart of an operation of a main terminal when the message encrypted through the memo app of the main terminal is identified through an auxiliary terminal according to another embodiment of the present disclosure.

FIG. 8 illustrates an example of a flowchart of an operation of the main terminal when the message encrypted through the memo app is identified through the auxiliary terminal according to another embodiment of the present disclosure.

Referring to FIG. 8, it is assumed that a user 800 executes the memo app 702 of the main terminal 100 and thus encrypted text is displayed on a display screen of the memo app 702. When the memo app 702 detects provision of a user input of the user 800 for the encrypted text displayed on the screen in step 800*a*, the memo app 702 makes a request for processing the encrypted text through the system SW 106 in step 800*b*. Then, in step 802, the system SW 106 identifies the encrypted text and identifies whether there is an additional particular pattern indicating processing by an auxiliary terminal 804 in the encrypted text. When it is assumed that there is the additional particular pattern, the system SW 106 identifies the auxiliary terminal 804 connected to a communication unit 802 in step 804. Further, the system SW 106 instructs the communication unit 802 to transfer the encrypted text to the identified auxiliary terminal 804. Here, the additional particular pattern may be expressed by character strings in a particular URL type. Then, in step 806, the communication unit 802 transfers the encrypted text to the connected auxiliary terminal 804.

Figure 9:
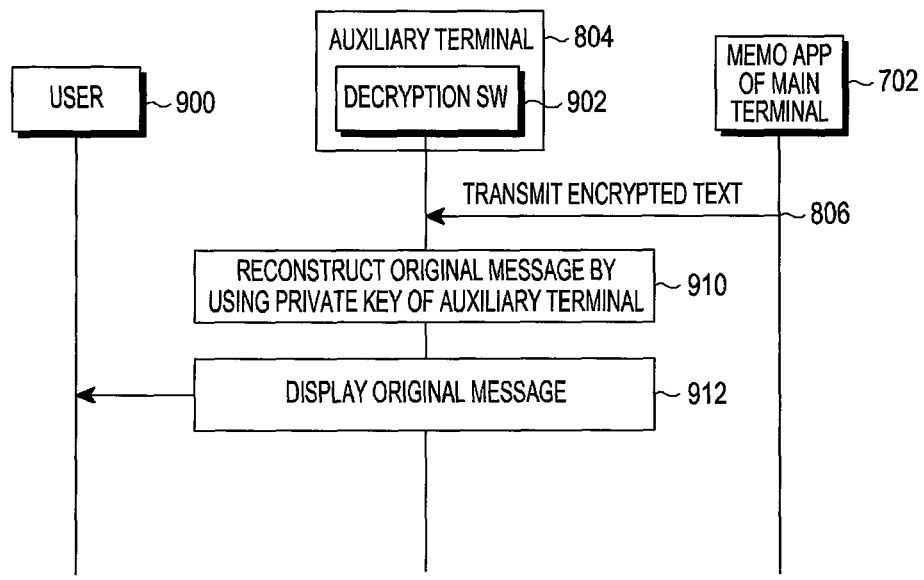
FIG. 9 illustrates an example of a flowchart of an operation in which the auxiliary terminal decrypts the encrypted message acquired from the main terminal according to another embodiment of the present disclosure.

FIG. 9 illustrates an example of a flowchart of an operation in which the auxiliary terminal decrypts an encrypted message acquired from the main terminal according to another embodiment of the present disclosure. For convenience of the description, a case where the auxiliary terminal 804 includes a decryption SW 902 is illustrated as an example.

Referring to FIG. 9, when encrypted text is transferred from the main terminal through procedures of FIGS. 7 and 8 in step 806, the decryption SW 902 of the auxiliary terminal 804 decrypts an encryption key by using a private key of the auxiliary terminal in step 910. Further, in step 910, the decryption SW 902 decrypts an original message by using the decrypted encryption key. In addition, the decryption SW 902 displays the decrypted original message on the display screen of the auxiliary terminal 804 in step 912.

Meanwhile, according to another embodiment of the present disclosure, another embodiment of the operation for designating the terminal for transmission/reception of the encrypted message, storing the encryption key for encryption and decryption of designated terminals, and performing the encryption according to the aforementioned embodiments will be described.

Figure 10:
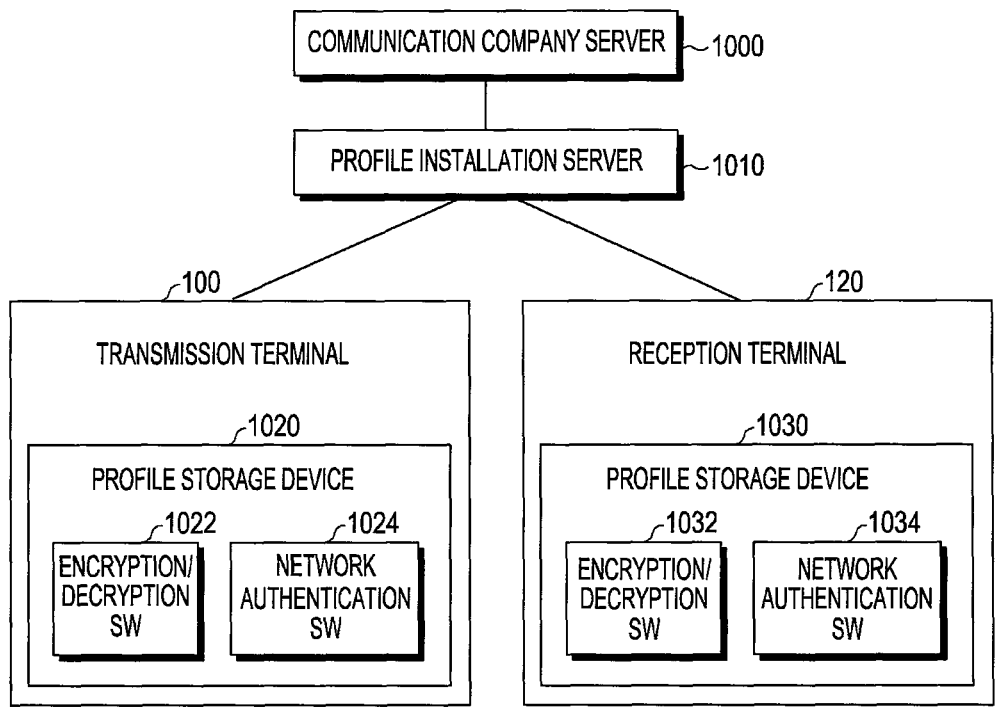
FIG. 10 illustrates an example of a configuration diagram of all devices for transmitting and receiving the encrypted message between terminals according to another embodiment of the present disclosure.

FIG. 10 illustrates an example of a configuration diagram of all devices for transmitting and receiving an encrypted message between mobile terminals according to another embodiment of the present disclosure.

Referring to FIG. 10, it is assumed that the transmission terminal 100 further includes a profile storage device 1020 as well as the elements of FIG. 1. The profile storage device 1020 is a device which may install a network authentication SW 1024 for mobile communication access of the terminal through a profile installation server 1010 or separately install only a parameter for network authentication. The network authentication SW 1024 allows the corresponding terminal having the profile storage device in which the network authentication SW is installed to use mobile communication through a mutual authentication with a communication company server 1000 of a particular communication company, and thus uses a network access secret key for the network access. Similarly, it is assumed that the reception terminal 120 also includes a profile storage device 1030 as well as the elements of FIG. 1. The profile storage device 1030 of the reception terminal 120 operates in the same way as that of the profile storage device 1020 of the transmission terminal 100. Hereinafter, according to another embodiment of the present disclosure, the corresponding terminal designates a terminal for transmission/reception of an encrypted message, makes a request for generating an encryption key which can encrypt and decrypt text for the designated terminal, and acquires the encryption key from the corresponding profile installation server.

Figure 11:
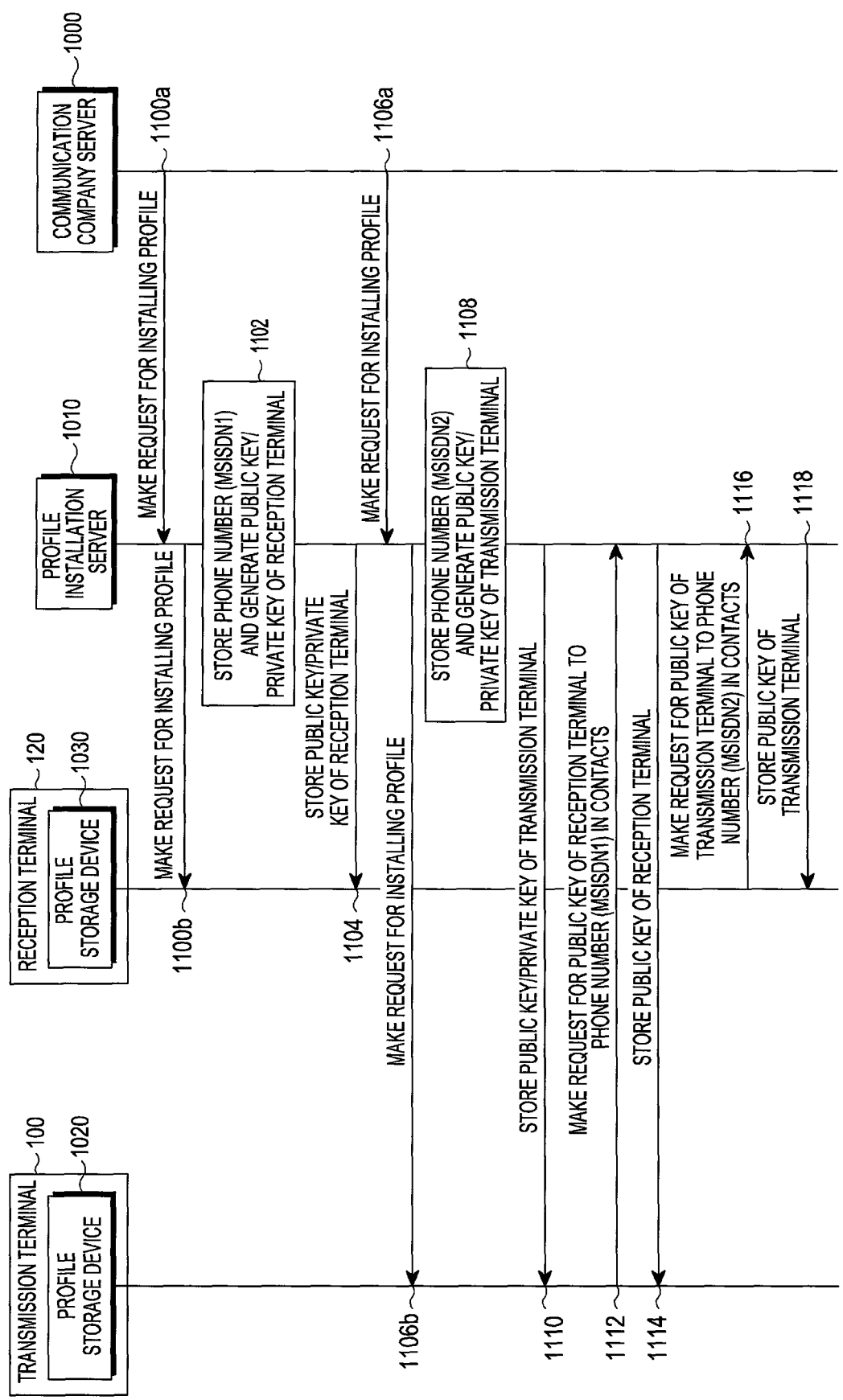
FIG. 11 illustrates an example of a flowchart of an operation in which the terminal stores an encryption key according to another embodiment of the present disclosure.

FIG. 11 illustrates an example of a flowchart of an operation for storing an encryption key in the transmission terminal and the reception terminal by the elements of FIG. 10.

Referring to FIG. 11, it is assumed that the reception terminal 120 subscribes to a predetermined communication company. Then, the reception terminal 120 receives a profile installation request for enabling network access corresponding to the communication company through the profile installation server 1010 from the communication company server 1000 of the communication company through steps 1100a to 1100b. Then, the profile storage device 1030 of the reception terminal 102 installs the profile acquired by the profile installation request. When the profile is installed, although not illustrated, the reception terminal 120 may access a mobile communication network of the communication company through the network authentication SW 1034 and use a communication function. Further, in step 1102, the profile installation server 1010 stores a phone number of the reception terminal 120 and generates a public key and a private key of the reception terminal 120. Further, in step 1104, the profile installation server 1010 stores the public key and the private key of the reception terminal 120 in the profile storage device 1030 of the reception terminal 120. According to another embodiment, the installation of the profile within the profile storage device 1030 and the storage of the public key and the private key of the corresponding terminal may be performed at the same time.

Similarly, when it is assumed that the transmission terminal 100 subscribes to the communication company, the transmission terminal 100 receives a profile installation request which enables network access corresponding to the corresponding communication company through the profile installation server 1010 from the communication company server 1000 in steps 1106a to 1106b. Then, the profile storage device 1020 of the transmission terminal 100 installs the profile. According to another embodiment, the installation of the profile within the profile storage device 1020 and the storage of the public key and the private key of the corresponding terminal may be performed at the same time.

Thereafter, the transmission terminal 100 having the profile installed therein may access the mobile communication network of the communication company through the network authentication SW 1024 and use the communication function as illustrated in FIG. 10. Further, in step 1108, the profile installation server 1010 stores a phone number of the transmission terminal 100, and generates a public key and a private key of the transmission terminal 100. In addition, in step 1110, the profile installation server 1010 stores the public key and the private key of the transmission terminal 100 in the profile storage device 1020 of the transmission terminal. In the embodiment of FIG. 11, the communication company to which the transmission terminal 100 is subscribed and the communication company to which the reception terminal 120 is subscribed are the same for convenience of the description. However, the communication company to which the transmission terminal 100 is subscribed and the communication company to which the reception terminal 120 is subscribed may be different from each other. In this case, it should be noted that the communication company servers may be different from each other.

Thereafter, each of the transmission terminal 100 and the reception terminal 120 may designate a terminal to perform transmission/reception of an encrypted message according to an embodiment of the present disclosure, make a request for a public key of the corresponding terminal to the profile installation server 1010, and acquire the public key through steps 1112 to 1118. For convenience of the description, it is assumed that the transmission terminal 100 and the reception terminal 120 designate each other as terminals to perform transmission/reception of the encrypted message.

More specifically, for example, the transmission terminal 100 may make a request for a public key corresponding to MSISDN1 to the profile installation server 1010 by using a phone number (MSISDN1) corresponding to the reception terminal 120 among contact information stored in the transmission terminal 100 in step 1112. Then, in step 1114, the profile installation server 1010 acquires the public key corresponding to the phone number and transfers the public key to the transmission terminal 100. Then, the profile storage device 1020 of the transmission terminal 100 may store the public key corresponding to MSISDN1 as the public key of the reception terminal 1020. Similarly, in step 1116, the reception terminal 120 may also make a request for a public key corresponding to MSISDN2 to the profile installation server 1010 by using a phone number (MSISDN2) corresponding to the transmission terminal 100 among contact information stored in the reception terminal 120. Then, in step 1118, the profile installation server 1010 transfers the public key corresponding to MSISDN2 to the reception terminal 120. Accordingly, the profile storage device 1030 of the reception terminal 120 may store the public key corresponding to MSISDN2 as the public key of the transmission terminal 100.

Figure 12:
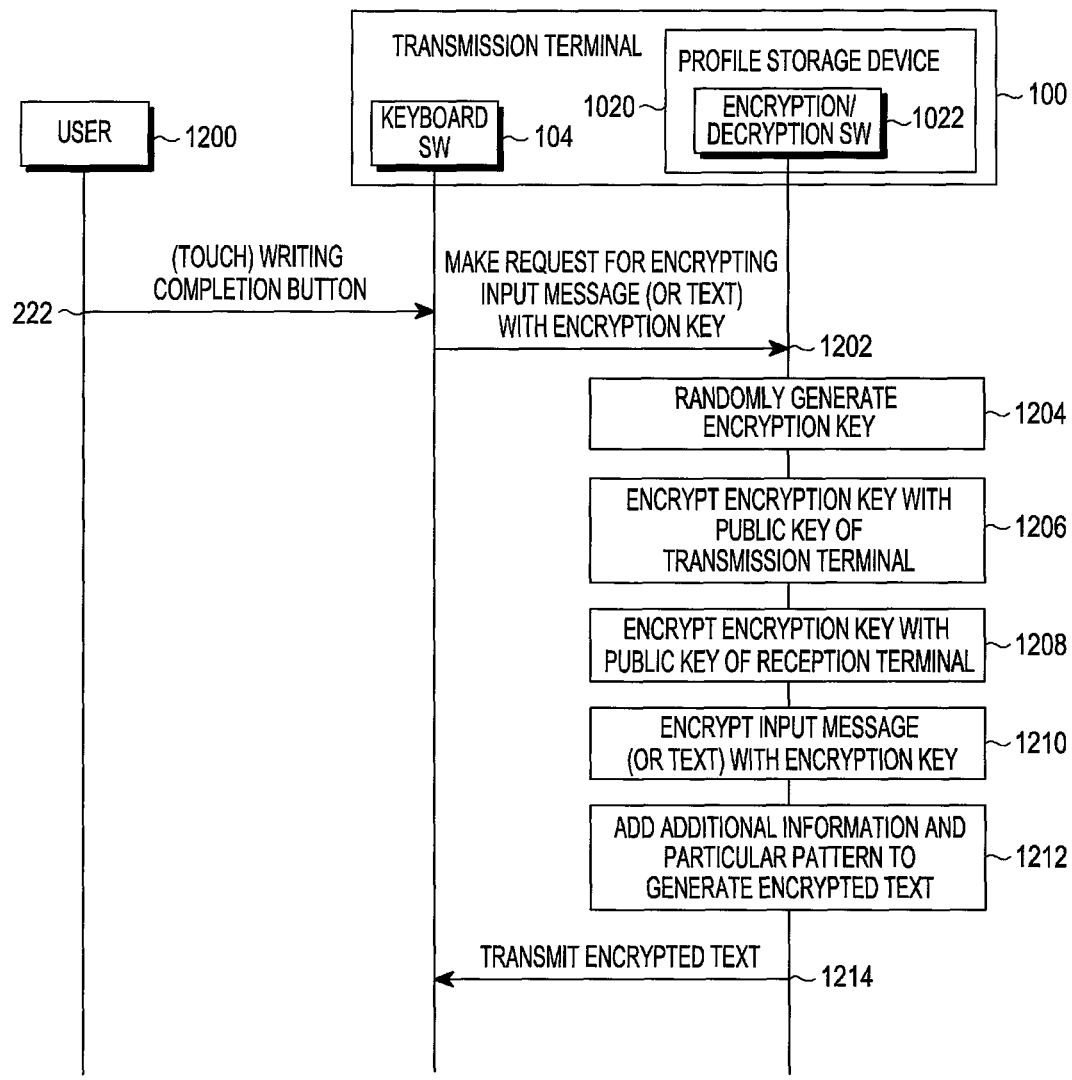
FIG. 12 illustrates an example of a flowchart of an operation in which the terminal performs an encryption according to another embodiment of the present disclosure.

FIG. 12 illustrates an example of a flowchart of an operation in which the transmission terminal encrypts a message according to another embodiment of the present disclosure. Here, for convenience of the description, the operations of steps 224 to 232 of the keyboard SW 104 of the transmission terminal 100 of FIG. 2 will be modified and described.

Referring to FIG. 12, it is assumed that the user 222 provides a user input such as a touch on a writing completion button provided by the keyboard SW 104 with respect to encrypted text through the message app or the memo app executed on the display screen of the transmission terminal 100 in step 222. Then, the keyboard SW 104 having detected the user input of the writing completion button transfers a request for encrypting the input text through the keyboard SW 104 of the transmission terminal 100 to an encryption/decryption SW 1022 of the profile storage device 1020 in step 1202. At this time, according to an embodiment, the keyboard SW 104 may randomly generate the encryption key. At this time, according to an embodiment, the keyboard SW 104 may transfer the randomly generated encryption key to the profile storage device 102 of the transmission terminal 100. Otherwise, according to another embodiment, the encryption/decryption SW 1022 of the profile storage device 1020 of the transmission terminal 100 may randomly generate the encryption key in step 1204. Further, in step 1206, the encryption/decryption SW 1022 encrypts the randomly generated encryption key with the public key of the transmission terminal 100 stored through the procedure of FIG. 11 to generate a first encryption key and transfers the encrypted public key to the keyboard SW 104. Similarly, in step 1208, the encryption/decryption SW 1022 encrypts the encryption key with the public key of the reception terminal to generate a second encryption key according to a request of the keyboard SW 104 of the transmission terminal. Then, in step 1210, the encryption/decryption SW 1022 encrypts the input text with the encryption key encrypted in step 1208. Further, the encryption/decryption SW 1022 generates encrypted text by adding additional information and a particular pattern to the message encrypted with the first encryption key, the second encryption key, and the randomly generated encryption key. In addition, in step 1214, the encryption/decryption SW 1022 may transfer the encrypted text to the keyboard SW 104 (1212).

Figure 13:
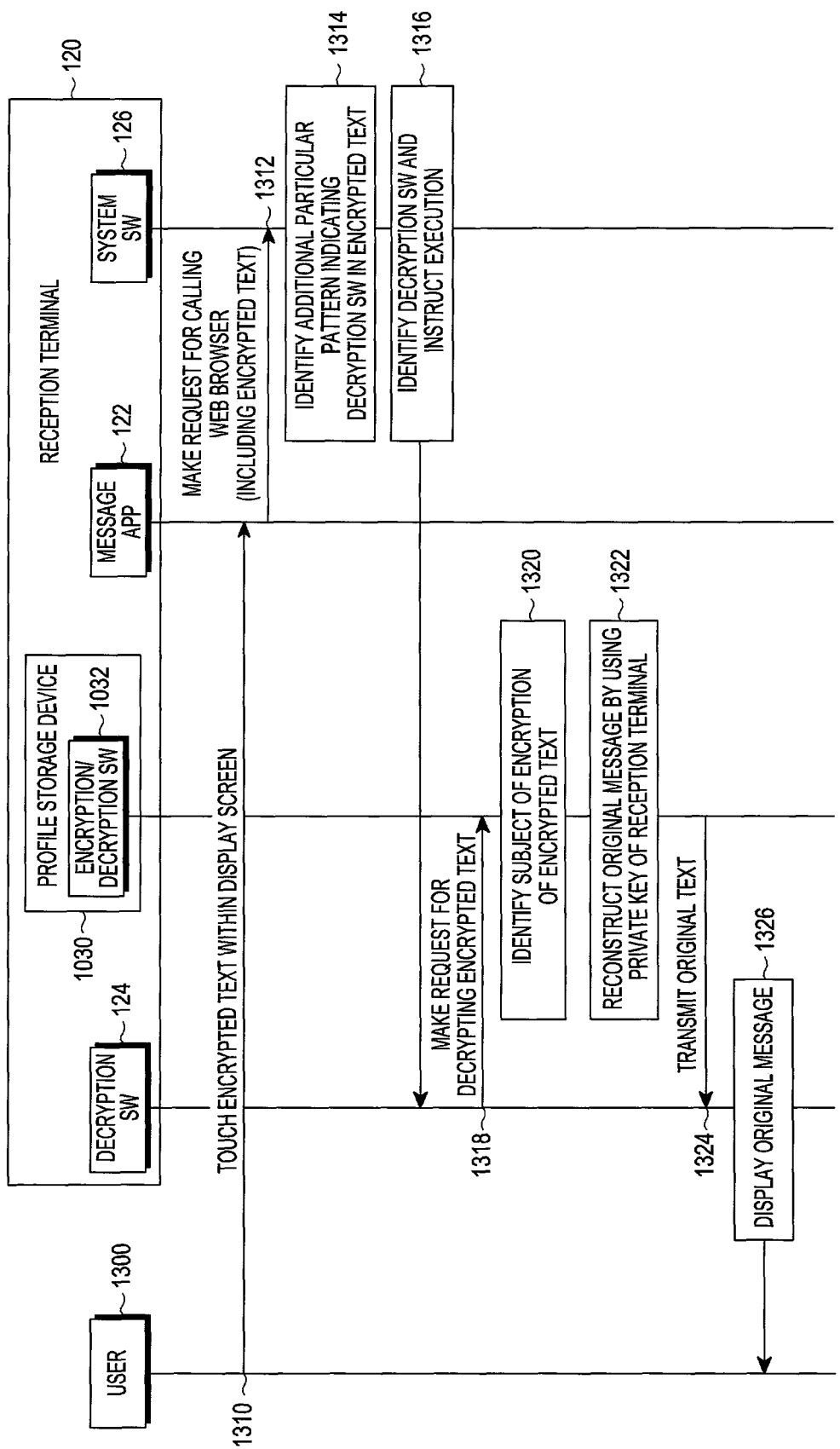
FIG. 13 illustrates an example of a flowchart of an operation in which the terminal performs a decryption according to another embodiment of the present disclosure.

FIG. 13 illustrates another example of a flowchart of an operation in which the reception terminal decrypts an encrypted message according to another embodiment of the present disclosure.

Referring to FIG. 13, it is assumed that a user 1300 provides a user input such as a touch on encrypted text displayed on the display screen of the reception terminal 120 in step 1310. Here, for convenience of the description, it is assumed that the encrypted text displayed on the display screen is text which the transmission terminal encrypts according to an embodiment of FIG. 12. Then, the message app 122 of the reception terminal 100 having recognized the user input transfers a call request of a web browser corresponding to the encrypted text to the system SW 126 in step 1312. The call request includes the encrypted text. The system SW 126 having received the call request identifies whether the encrypted text included in the call request has a particular pattern in step 1314. For example, the particular pattern may be included in a URL address type such as "http://", "https://", or the like, and may include an additional particular pattern, for example, "http://secure.sec" mapped to the decryption SW. The system SW 126 according to an embodiment of the present disclosure stores in advance the decryption SW for decrypting the encrypted text according to each particular pattern. When the additional particular pattern exists based on a result of the identified, the system SW 126 instructs to execute the decryption SW 124 stored in advance in step 1316. The particular pattern corresponds to a normal URL address indicating a connection to a particular web browser. Accordingly, when the additional particular pattern is not included based on a result of the identification, the system SW 126 executes the web browser corresponding to the URL address.

The decryption SW 124 having received the instruction makes a request for decrypting the encrypted text to the encryption/decryption SW 1032 within the profile storage device 1030 of the reception terminal 120 in step 1318. Then, in step 1320, the encryption/decryption SW 1032 identifies a subject of the encryption of the "encrypted text" to be decrypted. At this time, the encrypted text includes the first encryption key generated by encrypting the randomly generated encryption key with the public key of the transmission terminal 100 and the second encryption key generated by encrypting the randomly generated encryption key with the public key of the reception terminal 120 as described above. A process of identifying the encryption subject is described below. Specifically, the encryption/decryption SW 1032 decrypts each of the first encryption key and the second encryption key by using the private key of the reception terminal 120 acquired from the profile storage device 1030 and stored in advance. Further, a terminal having a successfully decrypted encryption key is determined as the subject of the encryption. For example, it is assumed that the second encryption key is successfully decrypted and the reception terminal 120 is identified as the subject of the encryption. Then, the encryption/decryption SW 1032 decrypts the encrypted message within the encrypted text by using an encryption key randomly acquired through the decryption of the second encryption key in step 1322. Further, in step 1324, the decryption SW 124 receives the decrypted original message. In addition, the decryption SW 124 makes a control to display the original message on the display screen of the reception terminal 120 in step 1326. According to an embodiment, the decrypted original message may be displayed through a separate partial window such as a pop up window or the like on the display screen of the reception terminal 120, rather than through the screen where the message app 122 is executed. Further, according to another embodiment, a lock function may be added so that the decrypted original message can be identified by only limited users.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method for transmitting an encrypted message at a transmission device, the method comprising:
  based on a first user input to run a message application being detected, displaying a keyboard supporting a security mode;
  detecting a second user input to switch to the security mode, wherein the second user input is input through the keyboard;

switching to the security mode in response to the second user input;

detecting a third user input for a message;

based on a writing completion instruction of the message being detected on the keyboard, generating an encrypted message including a pattern mapped to decryption software by encrypting the message, wherein the pattern mapped to the decryption software is used for identification of the decryption software that is used to decrypt the encrypted message;

displaying the encrypted message in a form of an encrypted text; and transmitting, to a reception device, the encrypted message in the form of the encrypted text, wherein the decryption software is pre-stored in each of the transmission device and the reception device according to the pattern mapped to the decryption software.

2. The method of claim 1, further comprising temporarily storing the message, wherein the transmitting the encrypted message comprises:

based on a fourth user input to transmit the encrypted message being detected on the keyboard, deleting the temporarily stored message and transmitting the encrypted message to the reception device.

3. The method of claim 1, wherein the encrypting of the message comprises:

generating a random key, and generating a first encryption key encrypting the random key with a public key of the transmission device;

generating a second encryption key encrypting the random key with a public key of the reception device; and encrypting the message with the random key, and including the first encryption key, the second encryption key and the encrypted message in the encrypted text.

4. The method of claim 3, wherein the generating the second encryption key comprises:

transmitting a request for the public key of the reception device to a communication server, and acquiring, from the communication server, the public key of the reception device.

5. The method of claim 3, wherein the encrypting of the message comprises generating the encrypted text comprising the first encryption key, the second encryption key and the encrypted message as a character string comprising the pattern mapped to the decryption software.

6. The method of claim 1, further comprising controlling to display the encrypted message on a screen of an auxiliary device according to importance of the encrypted message when the encrypted message is decrypted.

7. A method for receiving an encrypted message at a reception device, the method comprising:

receiving, from a transmission device, the encrypted message in a form of an encrypted text;

displaying the encrypted message in the form of the encrypted text;

based on detecting a user input associated with the encrypted message, determining whether a pattern mapped to decryption software is included in the encrypted message, wherein the pattern mapped to the decryption software is used for identification of the decryption software that is used to decrypt the encrypted message; and based on the pattern being determined to be included in the encrypted message, executing the decryption software mapped to the pattern to decrypt an original message extracted from the encrypted message and displaying the decrypted original message, wherein the decryption software is pre-stored in each of the transmission device and the reception device according to the pattern mapped to the decryption software.

8. The method of claim 7, wherein the encrypted message comprised in the encrypted text, and the encrypted text is a character string type including a first encryption key generated by encrypting a random key generated by the transmission device with a public key of the transmission device, a second encryption key generated by encrypting the random key with a public key of the reception device, and the original message encrypted with the random key.

9. The method of claim 8, wherein the decrypting of the original message comprises:

obtaining the random key by decrypting the second encryption key using the public key of the reception device; and decrypting the original message with the random key as the reception device.

10. The method of claim 7, wherein the displaying the decrypted original message comprises:

displaying a lock screen; and based on a user input corresponding to release the lock screen being detected, displaying the decrypted original message.

11. A transmission device for transmitting an encrypted message, the transmission device comprising:

a display;

a controller configured to:

based on a first user input to run a message application being detected, control the display to display a keyboard supporting a security mode;

detect a second user input to switch to the security mode, wherein the second user input is input through the keyboard, switch to the security mode in response to the second user input, detect a third user input for a message, based on a writing completion instruction of the message being detected on the keyboard, generate an encrypted message including a pattern mapped to decryption software by encrypting the message, wherein the pattern mapped to the decryption software is used for identification of the decryption software that is used to decrypt the encrypted message, control the display to display the encrypted message in a form of an encrypted text; and a transceiver configured to transmit, to a reception device, the encrypted message, wherein the decryption software is pre-stored in each of the transmission device and the reception device according to the pattern mapped to the decryption software.

12. The transmission device of claim 11, wherein the controller is further configured to temporarily store the message, and wherein based on a fourth user input to transmit the encrypted message being detected on the keyboard, the controller is configured to delete the temporarily stored message and control the transceiver to transmit the encrypted message to the reception device.

13. The transmission device of claim 11, wherein the controller is further configured to generate a random key, and generate a first encryption key encrypting the random key with a public key of the transmission device, generate a second encryption key encrypting the random key with a public key of the reception device, and encrypt the message with the random key, and include the first encryption key, the second encryption key and the encrypted message in the encrypted text.

14. The transmission device of claim 13, wherein the transceiver is configured to transmit a request for the public key of the reception device to a communication server and acquire, from the communication server, the public key of the reception device.

15. The transmission device of claim 13, wherein the controller is configured to generate the encrypted text comprising the first encryption key, the second encryption key and the encrypted message as a character string comprising the pattern mapped to the decryption software.

16. The transmission device of claim 11, wherein the controller is further configured to control to display the encrypted message on a screen of an auxiliary device according to an importance of the encrypted message when the encrypted message is decrypted.

17. A reception device for receiving an encrypted message, the reception device comprising:
 a transceiver configured to receive, from a transmission device, the encrypted message in a form of an encrypted text; and
 a controller configured to:
  control a display to display the encrypted message by the encrypted text,
  based on a user input associated with the encrypted message being detected, determine whether a pattern mapped to decryption software is included in the encrypted message, wherein the pattern mapped to the decryption software is used for identification of the decryption software that is used to decrypt the encrypted message, and
  based on the pattern being determined to be included in the encrypted message, execute the decryption software mapped to the pattern to decrypt an original message extracted from the encrypted message and control the display to display the decrypted original message,
 wherein the decryption software is pre-stored in each of the transmission device and the reception device according to the pattern mapped to the decryption software.

18. The reception device of claim 17, wherein the encrypted message comprised in the encrypted text, and the encrypted text is a character string type including a first encryption key generated by encrypting a random key generated by the transmission device with a public key of the transmission device, a second encryption key generated by encrypting the random key with a public key of the reception device, and the original message encrypted with the random key.

19. The reception device of claim 18, wherein the controller is further configured to obtain the random key by decrypting the second encryption key using the public key of the reception device, and decrypt the original message with the random key as the reception device.

20. The reception device of claim 17, wherein the controller is configured to control the display to display a lock screen, and based on a user input corresponding to release the lock screen being detected, control the display to display the decrypted original message.

* * * * *